United States Patent [19]
Bahr et al.
[11] 4,376,943
[45] Mar. 15, 1983

[54] RECORD CARRIER FOR AN ELECTRO-EROSION PRINTER AND METHOD FOR MAKING SAME

[75] Inventors: Dietrich J. Bahr, Herrenberg; Marian Briska, Böblingen, both of Fed. Rep. of Germany

[73] Assignee: International Business Machines Corporation, Armonk, N.Y.

[21] Appl. No.: 274,964

[22] Filed: Jun. 18, 1981

[51] Int. Cl.[3] .......... G01D 15/24
[52] U.S. Cl. .......... 346/135.1
[58] Field of Search .......... 346/1.1, 108, 135.1

[56] References Cited

U.S. PATENT DOCUMENTS 3,833,409 9/1974 Peshin .......... 346/135.1 X
3,889,272 6/1975 Kong Lou .......... 346/1.1 X
4,217,596 8/1980 Jung .......... 346/135.1

FOREIGN PATENT DOCUMENTS 893333 4/1962 United Kingdom .......... 346/135.1

*Primary Examiner*—Donald A. Griffin
*Attorney, Agent, or Firm*—Joseph G. Walsh

[57] ABSTRACT

A record carrier for an electro-erosion printer having an outer metal layer surface with roughness of high frequency, low amplitude and a soft, rounded-off waviness practically without edges or steps.

9 Claims, 3 Drawing Figures

RECORD CARRIER FOR AN ELECTRO-EROSION PRINTER AND METHOD FOR MAKING SAME

FIELD OF INVENTION

Figure 1:
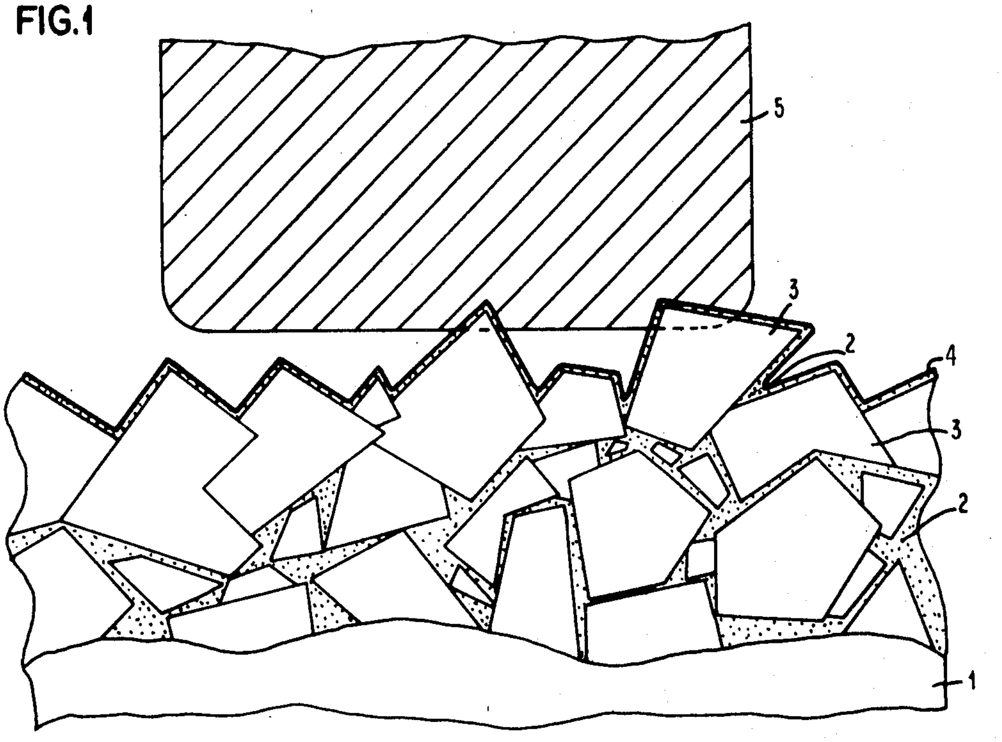

The invention relates to a record carrier for an electro-erosion printer with a base material coated with a laquer layer containing pigment, and covered by a thin metal layer containing aluminum, and a method for making such a record carrier.

BACKGROUND ART

Record carriers of this type have been known for quite some time. In the production of record carriers that are vapor-deposited with aluminum or coated therewith, it is necessary for various reasons, especially in view of the necessary dullness, the copying characteristics after printing, and the correct burnishing during printing, that the surface show a certain roughness. This is because fillers in the lacquer layer beneath the aluminum layer more or less protrude from the surface. The dullness increases with the amount of admixed fillers, since the light diffusion increases through the closely packed arrangement of the pigment bodies, i.e. the density of peaks per surface unit. However, there also increases the sensitivity to abrasion and scratching traces, as during printing the electrodes merely slide over the peaks of the pigment grains, and tear the aluminum layer there. With an increasing filler proportion, the sharpness of the protruding pigment grain contours increases, too, since the grains have scarcely any surrounding lacquer left. Furthermore, highly filled lacquers are always less stable and therefore show a chalking tendency.

There exist various methods of reducing the abrasion and scratching traces by means of the lacquer composition selected:

(a) Low pigment-content, high-gloss lacquers with soft pigments as e.g. carbon black or $CaCO_3$ are used. Such record carriers have a high degree of brightness of 40% to 50%. As a calibrating standard a planar, polished black glass plate is used having a degree of brightness of 100%. With a degree of brightness of 40%, the copying characteristics are still rather poor. On the other hand, the electrode abrasion is low. The characteristics with respect to abrasion or scratching traces, however, can substantially be improved in that a gliding layer on the basis of a metallic soap in accordance with German patent application No. P 30 07 331, German patent application No. P 30 11 591 and, in particular, the metallic soap in accordance with German patent application No. P 30 32 223.7, is used to which 10 to 30% by weight of a multi-functional, aliphatic, saturated or unsaturated alcohol are admixed. A thus modified metallic soap is preferably applied to the aluminum layer surface by rubbing on, rubbing in and polishing.

(b) Very hard fillers (e.g. quartz powder) are used which cannot be destroyed by the print electrodes. The lacquers are highly filled, too, with the filler having merely to be firmly embedded in the lacquer to avoid chalking. These lacquers have a very low degree of brightness of up to 10% and have thus very positive copying characteristics. They can also show an extremely low amount of abrasion traces since the electrodes slide only on the peaks on the pigment grains but cannot destroy them. The only, but rather important, disadvantage of such a pigmenting is the extremely high electrode abrasion.

Here, too, the abrasion traces can be reduced by using metallic soaps, or modified metallic soaps in accordance with the above-mentioned German patent applications.

In all cases, however, a maximum adhesion of the aluminum layer over the entire surface is an essential condition for a low amount of abrasion or scratching traces.

Highly-filled lacquers with few abrasion traces should contain hard pigments since with soft pigments surface damage is too high, which in turn causes strong abrasion traces.

The quality of the polymer used for the lacquer is of course very important too, but even the hardest and toughest polymer, with a high filling with soft pigments will always show quite strong abrasion traces. This is due to the sharp surface contours of the protruding pigments, and to the destruction of the pigments by the electrodes, as well as to the high surface pressure by the electrodes caused by the form of the pigments.

Quite generally, it can be said that highly filled lacquers practically show an angular or acicular waviness of the surface, and that thus the necessary dullness or the necessary degree of brightness are easily achieved. For high copying characteristics, degrees of brightness of 20% to 25% are required. Experience has shown that a degree of brightness of less than 20% involves a too high graying of the aluminum layer, which can be explained by the increased light absorption at the sharp edges. With a degree of brightness of 10% to 12% the paper is visibly gray.

With the low pigment content-lacquers the situation is different, i.e. the electrode slides only over a few pigment grains, which furthermore are coated with a rather thick lacquer layer, and thus protected. The surface pressure of the electrodes is high, too, but the contours of the protruding pigments are of a soft waviness. Thus, the polymer is exposed to very high strain at the few points of contact. Since this waviness is of a very low frequency the dullness is low, too.

Therefore, the hitherto available lacquers do not permit a perfect solution for the problem of abrasion traces, even when specifically modified metallic soaps are used.

The object of the invention can thus be defined as follows. A surface of the lacquer layer and consequently of its covering and very thin aluminum layer is to be provided, with the following properties:

1. a high frequency of the waviness,
2. a soft waviness,
3. a high mechanic strength and toughness through thick lacquer layers on the pigment grains,
4. a high dullness,
5. a low graying,
6. a low electrode abrasion, and
7. a homogeneous adhesion of the aluminum layer to the lacquer layer.

Preferably, the following characteristics are to be achieved, e.g.

8. a low surface pressure of the electrodes, and
9. a low strain on the lacquer layer.

SUMMARY OF THE INVENTION

These demands which had formerly been considered contradictory can, however, be achieved by a record carrier of the above-mentioned type as composed in accordance with the present invention, in that the roughness of the metal layer surface caused by the pigmenting of the lacquer layer shows a high frequency, a low amplitude and a soft, rounded-off waviness practically without edges or steps. The arrangement is preferably of such a design that the lacquer layer comprises two superimposed layers, that the first layer over the base material comprises a lacquer highly filled with a soft pigment, the grain size of the pigment being such that the surface shows a roughness of more than approximately 5 μm, and that the second layer comprises a low pigment-content lacquer containing only fine, soft pigment with the grain size of less than 1 μm to approximately 2 μm. On the other hand, it is also highly advantageous to procees so that the lacquer layer comprises two superimposed layers, that the first layer over the base material comprises a lacquer highly filled with soft pigment, the grain size of the pigment being such that the surface shows a roughness of more than approximately 5 μm, and that the second layer comprises a lacquer which, instead of the pigment, contains a soluble dye. It is of particular advantage when the first and second lacquer layers are composed on the basis of the same polymer.

Such a record carrier can be produced in accordance with the invention in that the first lacquer layer comprises an 8% to 12% solution of a high molecular weight cellulose acetate butyrate in ethyl acetate which also contains 15% to 20% by weight $CaCO_3$ with a granulation of 10 μm to 15 μm, 2% to 3% by weight of fine or coarse grain carbon black, and 2% by weight plasticizer, and that the second lacquer layer comprises an 8% to 12% solution of a high molecular weight cellulose acetate butyrate in ethyl acetate which furthermore contains 0 to 1% by weight $CaCO_3$ with a granulation of 1 μm to 2 μm maximum, 2% to 3% by weight fine carbon black with a granulation of 1 μm to 2 μm maximum, and 2% by weight plasticizer, or that instead of 2% to 3% by weight of fine-grain carbon black the second lacquer contains a quantity of an equally effective soluble dye. Advantageously, a first polymeric lacquer layer highly filled with pigment is provided on the base material, said lacquer layer containing only soft pigment with a grain size of more than 5 μm, and thereupon another polymeric lacquer layer is provided which contains either only fine, soft pigment with a grain size of less than 1 μm to approximately 2 μm, or a soluble dye.

The invention will now be described in detail with reference to two embodiments referring to the enclosed drawings.

Figure 2:
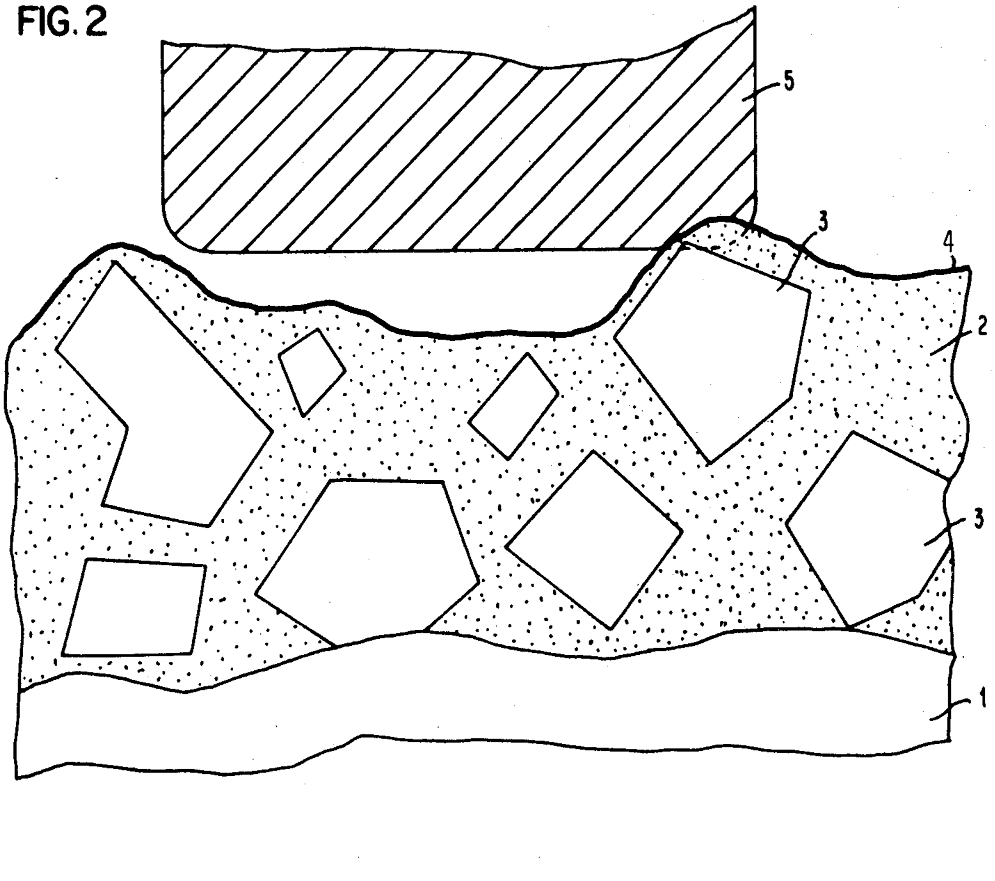
Figure 3:
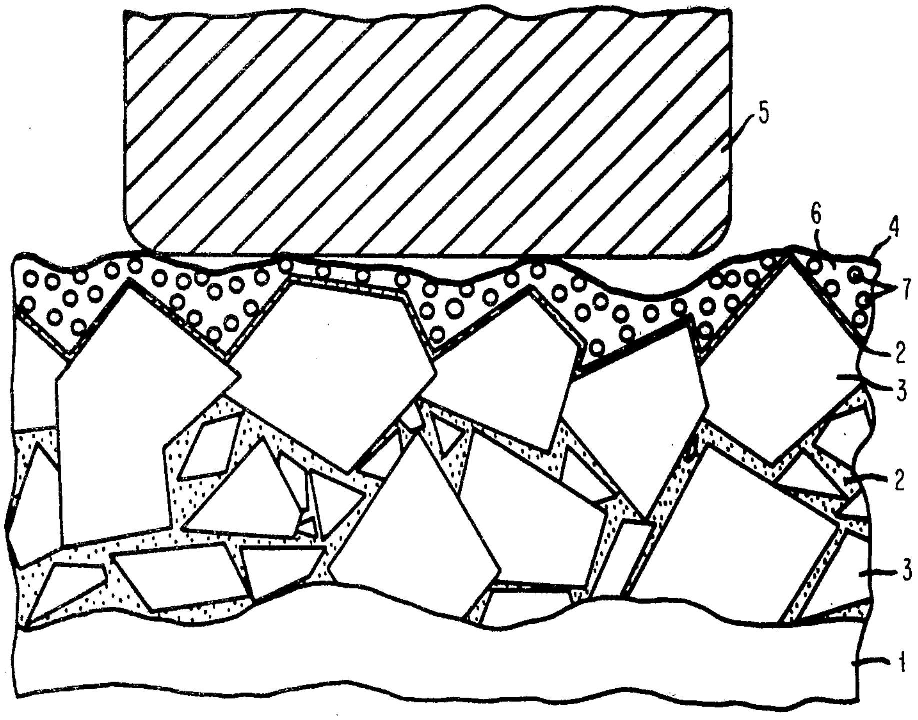

The drawings show the following:

FIG. 1: considerably enlarged, a cross-section of a record carrier, and over it a schematical representation of a recording electrode, this record carrier containing a highly filled lacquer with an angular and acicular waviness of the surface with high frequency, thus realizing the necessary dullness and the necessary degree of brightness, respectively;

FIG. 2: a considerably enlarged schematical representation of a record carrier, where the lacquer is of a low pigment-content only so that the electrode of which only the contours are given slides over few pigment grains only which are coated with a thick polymeric layer; and FIG. 3: a considerably enlarged cross-section of a record carrier composed in accordance with the present invention.

As shown in FIG. 3 which is used to explain the inventive idea, a first lacquer layer 2 is applied on a base material, as e.g. paper 1. This lacquer contains only soft pigment, which consequently causes a low electrode abrasion only. The grain size of this pigment is such that on the surface of the lacquer layer, and consequently on the surface of aluminum layer 4 covering it, there is a roughness, i.e. a distance between highest peaks and lowest valleys, of more than approximately 5 μm. Furthermore, this lacquer is so highly filled that it has an extremely low degree of brightness of less than 5%. After a vapor deposition of an aluminum layer, this lacquer would be of a very gray appearance, and furthermore, there would be considerably chalking. Also shown are the contours of a writing electrode 5.

Covering the first lacquer layer 2, a second lacquer layer 6 is provided. This lacquer layer 6 contains only fine and soft pigment 7 with a diameter of less than 1 μm to approximately 2 μm. This lacquer layer 6 shows a very low filling. Although in exceptional cases different polymers can be used for lacquer layers 2 and 6, provided they are compatible, the same polymer will mostly be used for both lacquer layers. Owing to this second lacquer layer 6, a very soft and rounded-off waviness of high frequency is obtained, superimposed with a micro-roughness of the fine pigment in the second lacquer layer 6. As shown strictly schematically, pigment grains 7 close to the surface are surrounded with a stable lacquer layer, i.e. there is no more chalking.

Below, two embodiments will be given for the necessary lacquer composition, cellulose acetates monobutyrates being used as polymer for the lacquer substrate.

EXAMPLE 1

Lacquer 1: A high molecular weight cellulose acetate butyrate (Cellit BF 900) in an 8% solution in ethyl acetate is mixed with 15% by weight $CaCO_3$ with a granulation of 10 μm to 15 μm as an approximately 20% fraction. Furthermore, 2% by weight carbon black in fine or coarse granulation, and 2% plasticizer are admixed.

Lacquer 2: For the second lacquer layer, the same high molecular weight cellulose acetate butyrate (Cellit BF 900) is used in an 8% solution in ethyl acetate with an admixture of 2% by weight carbon black with a granulation of maximum 1 μm to 2 μm, or instead, with an admixture of a soluble dye without pigment, and 2% by weight plasticizer.

EXAMPLE 2

Lacquer 1: A high molecular weight cellulose acetate butyrate (Cellit BL 700) is prepared in a 12% solution in ethyl acetate, and mixed with 20% by weight $CaCo_3$ with a granulation of approximately 10 μm to 15 μm as an approximately 20% fraction. Furthermore, 3% by weight carbon black in fine or coarse granulation and 2% by weight plasticizer are added.

Lacquer 2: High molecular weight cellulose acetate butyrate (Cellit BL 700) is mixed in a 12% solution in ethyl acetate with 1% by weight $CaCo_3$ with a granulation of maximum 1 μm to 2 μm, with 3% by weight carbon black with a granulation of maximum 1 μm to 2 μm, or instead with a soluble dye without pigment, and with 2% by weight plasticizer.

With these lacquer compositions for the first and the second lacquer layer, excellent results can be achieved, particularly when an adhesion promoter is used between carrier material and lacquer layer. However, instead of the polymers used here for the first and second lacquer layer, it is also possible to use stable, temperature-resistant lacquers on the basis of cellulose acetomonobutyrate, in accordance with German patent application No. P 30 19 574.5, where a cellulose acetomonobutyrate is mixed with a polyvinyl ester copolymer with side branches consisting of long aliphatic chains, at a ratio of 65 to 90% by weight to 10 to 35% by weight before being processed into the finished lacquer, with fillers and/or pigments being added.

It can equally be of considerable advantage when polymerized, heat-resistant lacquers of high carbon black compatibility and high pigment absorption on cellulose acetate basis, in accordance with German patent application No. P 30 29 428.1 are used. The lacquers of high carbon black compatibility and high pigment absorption mentioned there are produced in that two polymers of different melting point, e.g. a solvent-free cellulose acetate and a highly polymeric, solvent-free ethylene vinyl acetate copolymerizate, are processed together. Both components are processed into a copolymerizate in a kneader at approximately the mean softening temperature. This lacquer which can be produced e.g. of powdery or granular cellulose acetate, or granular or powdery polyvinyl acetate, or granular or powdery ethylene vinyl acetate copolymerizate, will yield even better results in combination with the new record carrier, i.e. when used for both lacquer layers.

These lacquers generally do not require an adhesion promoter between the lacquer layer and the base material.

It can thus be concluded that by means of the present invention, it is possible to obtain a lacquer surface and consequently a surface of a record carrier coated or vapor-deposited with a very thin aluminum layer, which more than satisfies all demands made above. This new lacquer surface has been found to have a high frequency of waviness, a soft, rounded-off waviness, a high mechanical strength and toughness through thick polymer layers on the pigment grains, as well as a high dullness. Furthermore, there is much less graying, and electrode abrasion can be kept low; and the vapor-deposited aluminum layer shows excellent adhesion. There is furthermore a low surface pressure of the electrodes, and a low strain on the lacquer polymer.

It is claimed:

1. A record carrier for an electro-erosion printer, said carrier coprising a base material coated with a lacquer layer containing a pigment, said lacquer layer being covered in turn by a thin metal layer comprising, aluminum, characterized in that the roughness of the metal layer surface caused by the pigment contained in the lacquer layer (2,6) has a high frequency, a low amplitude, and a soft, rounded-off waviness practically without edges or steps.

2. A record carrier as claimed in claim 1, characterized in that the lacquer layer comprises two superimposed lacquer layers (2,6), that the first lacquer layer (2) over the base material (1) comprises a lacquer highly filled with soft pigment, the grain size of said pigment (3) being such that the surface shows a roughness of more than approximately 5 μm, and that the second lacquer layer (6) comprises a low pigment content lacquer containing only fine, soft pigment (7) with a grain size of less than 1 μm to approximately 2 μm.

3. A record carrier as claimed in claim 2 characterized in that the first and the second lacquer layers are based on the same polymer.

4. A record carrier as claimed in claim 2, characterized in that the first lacquer layer comprises an 8% to 12% solution of a high molecular weight cellulose acetate butyrate in ethyl acetate which also contains 15 to 20% by weight $CaCO_3$ with a granulation of 10 μm to 15 μm, 2 to 3% by weight of fine or coarse granulation carbon black, and 2% by weight plasticizer, and that the second lacquer layer comprises an 8% to 12% solution of a high molecular weight cellulose acetate butyrate in ethyl acetate which also contains 0 to 1% by weight $CaCO_3$ with a maximum granulation of 1 μm to 2 μm, 2 to 3% by weight of fine carbon black with a maximum granulation of 1 μm to 2 μm, and 2% by weight plasticizer.

5. A record carrier as claimed in claim 4, characterized in that instead of 2 to 3% by weight of fine granulation carbon black, the second lacquer contains an equally effective quantity of a soluble dye.

6. A record carrier as claimed in claim 1, characterized in that the lacquer layer comprises two superimposed layers, that the first lacquer layer (2) over the base material comprises a lacquer highly filled with soft pigment, the grain size of said pigment being such that the surface shows a roughness of more than approximately 5 μm, and that the second lacquer layer (6) comprises a lacquer which contains a soluble dye.

7. A method for making a record carrier covered by a lacquer of high dullness resistant to abrasion and scratching traces, characterized in that a first polymeric lacquer layer highly filled with pigment is deposited on the carrier material, said layer containing only soft pigment with a grain size of more than 5 μm, and that another polymeric lacquer layer is applied thereon which contains either only fine, soft pigment with a grain size of less than 1 μm to approximately 2 μm, or a soluble dye.

8. A method as claimed in claim 7 characterized in that for both lacquer layers the same polymer is used.

9. A method as claimed in claim 7 characterized in that as lacquer polymers, polymers based on high moledular weight cellulose acetate butyrate are used.

* * * * *